United States Patent
Funcke (10) Patent No.: US 8,126,917 B2
(45) Date of Patent: Feb. 28, 2012

(54) METHOD AND DEVICE FOR TRANSPORTING AN OBJECT TO A DESTINATION ADDRESS SPECIFIED INCOMPLETELY

(75) Inventor: Gerhard Funcke, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 12/624,784

(22) Filed: Nov. 24, 2009

(65) Prior Publication Data

US 2010/0131536 A1 May 27, 2010

(30) Foreign Application Priority Data

Nov. 24, 2008 (DE) .......................... 10 2008 058 745
Dec. 8, 2008 (DE) .......................... 10 2008 061 012

(51) Int. Cl.
*G06F 17/30* (2006.01)

(52) U.S. Cl. ........ 707/781; 707/607; 707/615; 707/705; 707/809; 707/811; 707/912; 707/955; 707/956; 707/960; 709/232; 709/231; 709/205; 709/206; 709/207; 705/406; 715/221; 715/222; 715/223; 715/224; 715/225

(58) Field of Classification Search ................ 707/607, 707/615, 705, 809, 811, 912, 955, 956, 960; 709/232, 231, 205–207; 705/406; 715/221–225
See application file for complete search history.

(56) References Cited

U.S. PATENT DOCUMENTS 4,764,609 A 8/1988 Weigel et al.
(Continued)

FOREIGN PATENT DOCUMENTS

DE 196 44 163 A1 5/1998
(Continued)

OTHER PUBLICATIONS

EURASIP Journal on Applied Signal Processing 2004: 8, 1125-1134, Hindawi Publishing Corporation.

*Primary Examiner* — Frantz Coby
(74) *Attorney, Agent, or Firm* — Laurence A. Greenberg; Werner H. Stemer; Ralph E. Locher (57) ABSTRACT

A method and a device transport a postal object to an incompletely specified destination address. The object has at least one information item relating to a destination address to which the object is to be transported. A set of address components is predetermined. An address database is used which in each case contains a computer-available record per destination address for a set of possible destination addresses. Each record contains in each case one entry for each predetermined address component. At least one destination address information item on the object is detected. A screen form is used which contains in each case one input field for each address component. The detected destination address information is compared with the records of the address database. When exactly one record is consistent with all detected destination address information items, a transportation of the object to the destination address of the record is triggered.

12 Claims, 4 Drawing Sheets

| Tag Name (Sp1) | Input (Sp2) | Nos. of Matches (Sp3) | Selection |
|---|---|---|---|
| First Name | | 2,089,135 | |
| Last Name | | 345,123 | |
| Organization | | 761,361 | |
| Street | | 465,831 | |
| House Number | | 6,941 | |
| Floor | | 14,115 | |
| Post Box Number | | 4,603 | |
| Post Code | | 2,208 | |
| City | | 13,280 | |
| Country ID | | 245 | |

Candidates: 45,286,066 — CL
Sorting Codes: 39,186,153 — SC

U.S. PATENT DOCUMENTS

| | | |
|---|---|---|
| 6,292,709 B1 | 9/2001 | Uhl et al. |
| 6,510,159 B1 * | 1/2003 | Noriyuki ................ 370/401 |
| 6,570,159 B2 * | 5/2003 | Ankerhold ............... 250/338.5 |
| 6,578,080 B1 * | 6/2003 | Dwork .................... 709/229 |
| 6,701,352 B1 | 3/2004 | Gardner et al. |
| 6,925,080 B2 * | 8/2005 | Denecheau et al. ......... 370/392 |
| 7,031,959 B2 | 4/2006 | Garner et al. |
| 7,362,744 B2 * | 4/2008 | Basso et al. ............... 370/351 |
| 7,593,386 B2 * | 9/2009 | Basso et al. ............... 370/351 |
| 2002/0181466 A1 * | 12/2002 | Neustein et al. ............ 370/393 |
| 2004/0015493 A1 | 1/2004 | Garner et al. |
| 2005/0137991 A1 | 6/2005 | Bruce et al. |
| 2006/0149733 A1 | 7/2006 | Garner et al. |
| 2008/0044057 A1 | 2/2008 | Keller et al. |
| 2008/0279201 A1 * | 11/2008 | Lu et al. .................. 370/401 |
| 2009/0010405 A1 * | 1/2009 | Toebes ................... 379/93.23 |
| 2011/0110512 A1 * | 5/2011 | Chen et al. .............. 379/201.12 |

FOREIGN PATENT DOCUMENTS

| | | |
|---|---|---|
| DE | 10 2004 017 042 A1 | 10/2005 |
| EP | 0241186 A1 | 10/1987 |
| EP | 0 890 913 A1 | 1/1999 |
| WO | 02/41186 A1 | 5/2002 |
| WO | 2004/107219 A1 | 12/2004 |

* cited by examiner

FIG 2

| Tag Name | Input | Nos. of Matches | Selection |
|---|---|---|---|
| First Name | | 2,089,135 | |
| Last Name | | 345,123 | |
| Organization | | 761,361 | |
| Street | | 465,831 | |
| House Number | | 6,941 | |
| Floor | | 14,115 | |
| Post Box Number | | 4,603 | |
| Post Code | | 2,208 | |
| City | | 13,280 | |
| Country ID | | 245 | |
| | Candidates: | 45,286,066 | CL |
| | Sorting Codes: | 39,186,153 | SC |

Sp1, Sp2, Sp3, CSF, 1

FIG 3

| Tag Name | Input | Nos. of Matches | Selection |
|---|---|---|---|
| First Name  E1 | Jo | 35 | |
| Last Name  E2 | | 145,123 | |
| Organization | | 0 | |
| Street | | 161,831 | |
| House Number | | 1,941 | |
| Floor | | 315 | |
| Post Box Number | | 508 | |
| Post Code | | 1,908 | |
| City  E3 | | 11,680 | |
| Country ID | | 245 | |
| | Candidates: | 1,286,066 | CL |
| | Sorting Codes: | 1,167,848 | SC |

Sp1, Sp2, Sp3, CSF, 1

FIG 4

| Tag Name | | Input | Nos. of Matches | Selection |
|---|---|---|---|---|
| First Name | E1 | Joh | 5 | 01 Johannes |
| Last Name | E2 | | 25,016 | 02 Johanna |
| Organization | | | 0 | 03 Johannes-K |
| Street | | | 54,861 | 04 Johanna Gis |
| House Number | | | 742 | 05 John |
| Floor | | | 110 | |
| Post Box Number | | | 234 | |
| Post Code | | | 808 | |
| City | E3 | | 9,680 | |
| Country ID | | | 113 | |
| | Candidates: | 386,163 | | |
| | Sorting Codes: | 317,868 | | |

Sp1, Sp2, Sp3 — column headers. CSF — selection field; SR — scroll region; CL — candidates; SC — sorting codes.

FIG 5

| Tag Name | | Input | Nos. of Matches | Selection |
|---|---|---|---|---|
| First Name | E1 | Johannes | 1 | |
| Last Name | E2 | | 110,123 | |
| Organization | | | 0 | |
| Street | | | 121,831 | |
| House Number | | | 1,841 | |
| Floor | | | 315 | |
| Post Box Number | | | 508 | |
| Post Code | | | 1,908 | |
| City | E3 | | 9,680 | |
| Country ID | | | 130 | |
| | Candidates: | 26,066 | | |
| | Sorting Codes: | 23,934 | | |

FIG 6

| Tag Name | | Input | Nos. of Matches | Selection |
|---|---|---|---|---|
| First Name | E1 | Johannes | 1 | 01 Reichenbach |
| Last Name | E2 | | 26 | 02 Reichenberg |
| Organization | | | 0 | 03 Reichelsheim |
| Street | | | 18 | 04 Reichenau |
| House Number | | | 5 | 05 Reichen |
| Floor | | | 0 | |
| Post Box Number | | | 0 | |
| Post Code | | | 1 | |
| City | E3 | Rei | 5 | |
| Country ID | | | 1 | |

Candidates: 126 — CL
Sorting Codes: 102 — SC

Columns: Sp1, Sp2, Sp3; CSF, SR

FIG 7

| Tag Name | | Input | Nos. of Matches | Selection |
|---|---|---|---|---|
| First Name | E1 | Johannes | 1 | 01 Kluge |
| Last Name | E2 | K | 6 | |
| Organization | | | 0 | |
| Street | | | 6 | |
| House Number | | | 5 | |
| Floor | | | 0 | |
| Post Box Number | | | 0 | |
| Post Code | | | 1 | |
| City | E3 | Reichenau | 1 | |
| Country ID | | | 1 | |

Candidates: 1 — CL
Sorting Codes: 1 — SC

Columns: Sp1, Sp2, Sp3; CSF, SR

METHOD AND DEVICE FOR TRANSPORTING AN OBJECT TO A DESTINATION ADDRESS SPECIFIED INCOMPLETELY

CROSS-REFERENCE TO RELATED APPLICATION

This application claims the priority, under 35 U.S.C. §119, of German applications DE 10 2008 058 745.1, filed Nov. 24, 2008, and DE 10 2008 061 012.7, filed Dec. 8, 2008; the prior applications are herewith incorporated by reference in their entirety.

BACKGROUND OF THE INVENTION

Field of the Invention

The invention relates to a method and to a device for transporting an object, especially a postal item, to a destination address specified incompletely.

Sometimes, a postal item is to be transported which is provided with incomplete information for the respective destination address. For example, the sender does not know all components of the destination address, or an address component can be deciphered neither automatically nor manually, e.g. because the address component is soiled or is covered by an envelope.

In U.S. patent publication No. 2005/0137991 A1, the problem is solved in that a postal item is to be transported to a delivery point even though the delivery point can only be read partially. For example, the delivery point can be read only partially through an envelope window. The readable address components are compared with the records in several databases, namely with a database with U.S. city names (USPS city/state database—USPS means United States Postal Services), a database with ZIP codes (USPS ZIP+4 database) and a database with delivery points in the USA (USPS Delivery Point File (DPF)). If precisely one matching record is found, the postal item is transported to the corresponding delivery point.

The method described there assumes by implication that the address components are affixed to the postal item in the correct order.

In international patent disclosure WO 02/41186 A1, a method is described for comparing an address of a postal item with address records of a database with valid addresses. The address database contains a "delivery point database 505" and an "enhanced delivery point database 705" in which information about valid delivery points is stored. The database 705 contains additional "delivery point identification keys" with additional delivery information for the "U.S. Postal Service". If an addressee moves and can be reached under a new address, a "delivery point identification key" links the stored information about the old address with that about the new address so that forwarding is facilitated.

In international patent disclosure WO 2004/107219 A1, a method for searching for an address, e.g. for an e-mail address, is described. For this purpose, an inquiry is directed to at least one address database. It depends on what is known about the sought person, e.g. last name, ZIP code, residence, tax or insurance number or also birthday and age which information about the sought address is input. These search criteria are weighted differently. The search results are displayed on a screen device so that a user can view and check these search results. For the display, search results are weighted, e.g. in accordance with correspondence with the predetermined search fields. A user selects search results offered. A selected search result is verified with the aid of a further database, a "high-confidence database".

In published, European patent application EP 0890913 A1, a method and a device are described for setting up one's own local database by using publicly accessible databases and sending postal items, e.g. to a particular group of persons with the aid of this database. A user is offered a screen form with input fields for possible address components. The user selects the address components for which he wishes to provide default values, and places inputs into the corresponding input fields. In addition, the user selects which address databases are to be asked. From the default values of the user, an inquiry to each selected public database is in each case generated and transmitted. The search results are imported into the local database in order to be able to generate delivery information about the postal items.

In published, non-prosecuted German patent application DE 19644163 A1, a method and a device are described for deciphering the delivery point of a postal item. It is first attempted to decipher the delivery point automatically by using an address database. If this is not successful, an image of the postal item is displayed on a screen device and a video coder inputs a short address component, e.g. the ZIP code. It is attempted to use this additional information for automatically deciphering the address (OCR retry, that is to say a further automatic reading process). If this second attempt does not lead to an unambiguous result, either, the addresses which are then still possible are displayed on the screen device and a user performs a manual selection.

In published, non-prosecuted German patent application DE 10 2004 017 042 A1, a method is described for delivering a postal item to the receiver in spite of a faulty delivery point and taking into consideration advance instructions, e.g. a forwarding order.

SUMMARY OF THE INVENTION

It is accordingly an object of the invention to provide a method and a device for transporting an object to a destination address specified incompletely which overcome the above-mentioned disadvantages of the prior art methods and devices of this general type, which enable the destination address to be recognized even if the object is provided with incomplete information relating to the destination address and it cannot be automatically seen which address components are present.

With the foregoing and other objects in view there is provided, in accordance with the invention a method for controlling a transporting of an object. The object has at least one information item relating to a destination address to which the object is to be transported. A set of address components is predetermined and a predetermined address database is provided which in each case contains one computer-available record per destination address for a set of possible destination addresses. Each record in the predetermined address database in each case includes one entry for each predetermined address component. The method includes detecting at least one destination address information item on the object by automatically displaying a screen form on a screen device of a detection computer, the screen form in each case containing one input field for each address component. The following sequence is performed at least once:

after a user inputs into one of the input fields of the screen form, a character string input into the input field is detected and into which of the input fields the character string has been input is determined;

whether no record, exactly one record or several records of the predetermined address database are consistent with all previous user inputs is determined, a record is consistent with all the previous user inputs when each character string input into the input field is contained in an entry which the record has for the address component to which the input field corresponds; and checking whether a predetermined abort criterion is met.

The sequence is performed again if the abort criterion is not met. The abort criterion is met at least when exactly one record is consistent with all the previous user inputs. The transportation of the object to the destination address of the exactly one consistent record is triggered when exactly one consistent record has been found.

According to the solution, the transporting of an object is controlled. The object is provided with at least one information item relating to a destination address to which the object is to be transported.

A set of address components is predetermined. Furthermore, a predetermined address database is used. The address database contains in each case one computer-available record per destination address for a set of possible destination addresses. Each record in the address database contains in each case one entry for each predetermined address component.

On a screen device of a detection computer, a screen form is displayed. The screen form contains in each case one input field for each address component.

A sequence containing the following steps is performed at least once.

After a user inputs into one of the input fields of the form, the character string input in the input field is detected. It is also determined into which input field this character string has been input.

It is determined whether no record, exactly one record or several records are consistent with all previous user inputs.

It is checked whether a predetermined abort criterion is met.

A record is consistent with all previous user inputs when each character string input into an input field is contained in the entry which the record has for the address component to which the input field corresponds. The abort criterion is met at least when exactly one record is consistent with all previous user inputs.

The sequence is performed again if the abort criterion is not met.

In the case where exactly one record is found which is consistent with all detected destination address information items, a transportation of the object to the destination address of this one record is triggered.

The invention saves the necessity of first having to input certain address components during the data input and to complete these before other address components can be input and taken into consideration. Instead, it is made possible to input those address components which are present on the postal item and are decipherable. It is possible to input arbitrary character strings of address components in arbitrary order. After each input, a check is made for how many candidates (consistent records) are still remaining. By this measure, the invention saves input effort and makes it possible in many cases still to determine the destination address even with few readable address components.

The method and the device can be used particularly flexibly if the sequence just specified is carried out again after each input of a character into an input field.

The method and the device can be used, for example, for controlling the transportation of postal items, of baggage items or of freight items.

Other features which are considered as characteristic for the invention are set forth in the appended claims.

Although the invention is illustrated and described herein as embodied in a method and a device for transporting an object to a destination address specified incompletely, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
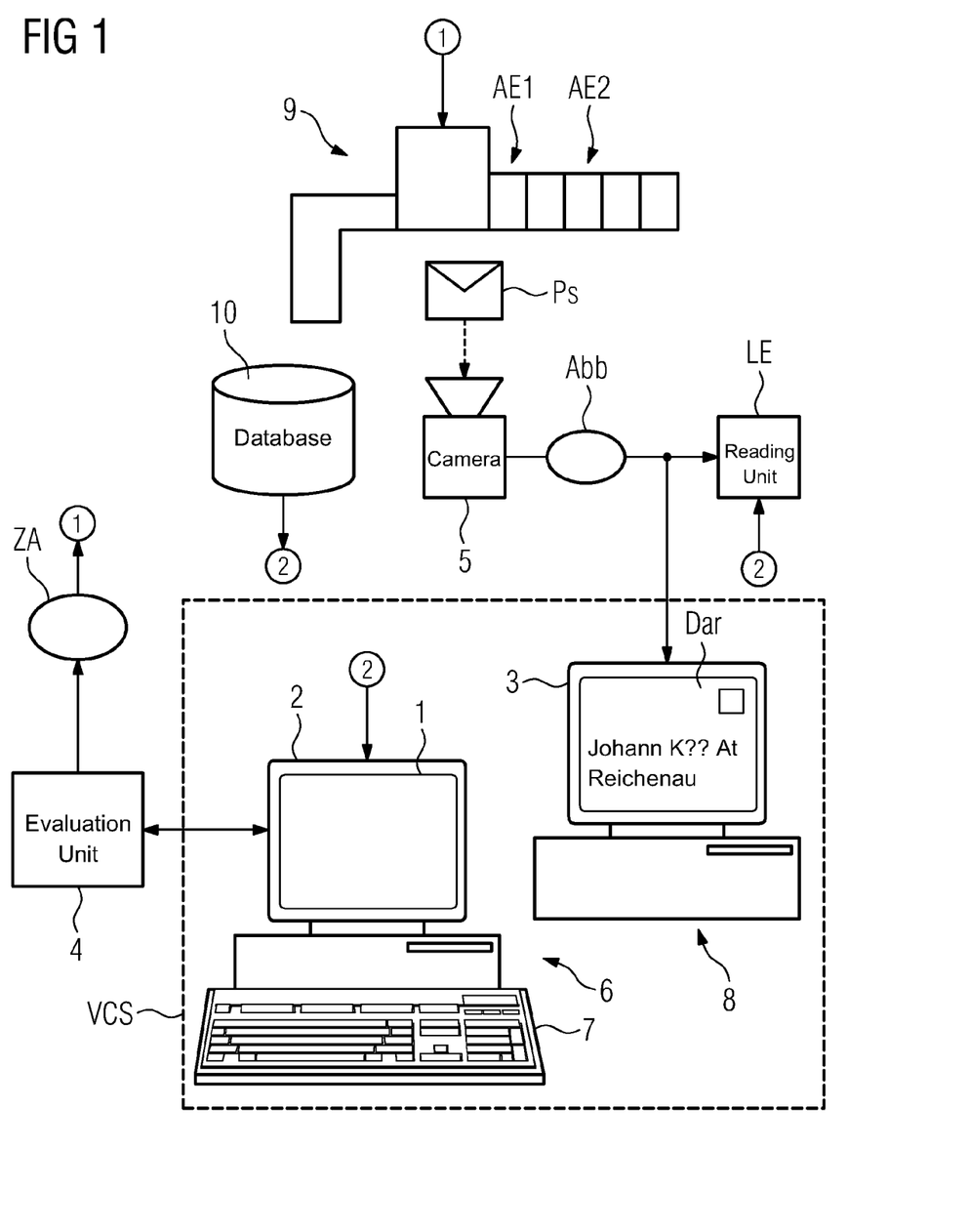
FIG. 1 is a diagrammatic illustration of a structure of a sorting system with a video coder station according to the invention.

Referring now to the figures of the drawing in detail and first, particularly, to FIG. 1 thereof, there is shown an exemplary embodiment of the invention used for controlling the transportation of postal items. Each postal item is provided with information on the destination address to which the postal item is to be transported.

The device according to the solution belongs to a video coding station VCS which is connected to a sorting system 9. The postal items successively pass through the sorting system. An image recording device in the form of a camera 5 generates a computer-available image Im of the surface of a postal item Pi which has the information relating to the destination address. A reading unit LE attempts to automatically decipher this information by optical character recognition (OCR). For this purpose, the reading unit LE evaluates the image Im.

If the reading unit is not successful, the image is transmitted to the video coding station VCS. FIG. 1 diagrammatically shows the structure of the video coding station VCS. The video coding station VCS contains:

a display computer 8 with a first screen device 3, a detection computer 6 with a second screen device 2 and an input device 7, e.g. a keyboard, and an evaluating unit 4.

The image of the postal item is displayed on the first screen device 3 as a result of which a representation Rep appears on the screen device 3 of the display computer 8. An operator deciphers the information relating to the destination address in the representation Rep of the image Im and performs inputs via the input device 7. These inputs are used for determining the destination address.

The sorting system 9 has a multiplicity of output devices AE1, AE2, . . . . The sorting system 9 channels each postal item into in each case one of these output devices AE1, AE2,. . . . For this purpose, the sorting system 9 uses a computer-available sorting plan which allocates in each case one output device to each possible destination address. It thus depends on the deciphered destination address into which output device the sorting system 9 will discharge the postal item.

Both the reading unit LE and the evaluating unit 4 of the detection computer 6 are connected to a central address database 10. In this database 10, in each case one computer-available record per destination address is stored for a set of possible destination addresses. For example, all possible destination addresses of a country or of another region into which a certain transporter transports postal items are taken into consideration by in each case one record in the database 10.

Various possible address components are predetermined. For example, the following address components are distinguished:
first name of a natural person as receiver,
last name of the natural person,
organization name of a legal person as receiver,
street,
house number,
floor or storey or building (e.g. rear building),
post box number,
post code or ZIP code,
city, and
country ID.

Even a complete destination address only contains some of these address components. If a natural person is the receiver of the postal item, the address component "organization" is not present, as a rule. Conversely, a legal person only has an organization name but no first name or last name. A large enterprise is in some cases identified unambiguously by its organization name and its post code. However, it is possible that a postal item is addressed to a particular natural person in an organization.

A postal item can be provided with only incomplete information relating to the destination address. For example, a postcard is addressed to "Johann K??, on the Reichenau". Obviously, the sender did not know any further address components. This information will tell a person that the receiver's first name is Johann, his last name begins with K and the receiver lives on the island (or castle) Reichenau.

Each record in the database describes a possible destination address. The record contains in each case one entry for each predetermined address component. As a rule, each record contains for at least one address component an identifier that the destination address does not comprise an entry for this address component. For example, a record for a natural person as receiver, and thus a destination address, contains an identifier that the destination address does not contain an entry for the address component "organization". Conversely, a record for a legal person as receiver, and thus destination address, contains an identifier that the destination address does not contain an entry for the first name and no entry for the last name.

In the exemplary embodiment each postal item examined passes through the sorting system 9. As a rule, the postal item, after that, again passes through the sorting system 9 or another sorting system 9. The sorting system 9 and each other sorting system through which the postal item passes uses an internal sorting code in order to discharge the postal item into the correct output compartment. In each case one output compartment is allocated to each sorting code. The sorting code specifies the destination point to which a postal item is to be delivered, that is to say, e.g., a particular letterbox or a particular postbox. The sorting code can also specify the route on which a mailman reaches this destination address and the position in his route order at which this destination address is located.

It is possible that the same sorting code is allocated to various destination addresses, e.g. because several persons of a household share one letterbox or a person uses an artist's name in addition to his "civil" name. The various names belong to different destination addresses, but the same sorting code is allocated to them. In one embodiment the respective sorting code is printed onto the postal item, e.g. in the form of a barcode or in a form legible to a mailman.

Each record in the address databases contains—in addition to the address components—a data field with the sorting code. The same sorting code can be allocated to various records.

In the exemplary embodiment, the video coding station has two screen devices. On one screen device 3, the image Im of the postal item Pi is displayed. The other screen device 2 belongs to the detection computer 6. On the detection screen device 2, a screen form 1 and a candidate selection list are displayed. The screen form has one line per address component and three columns.

The first column names the respective address component.

The second column contains an input field E1, E2, . . . for a user input for the respective address component.

In the third column, numbers with the respective different entries of still consistent records are displayed.

In the exemplary embodiment, a record is consistent with the previous user inputs with respect to an address component when the character string input by the user into the input field for this address component is comprised by the entry in the record for this address component or when the user has not yet made an input into this input field. In one deviation, the record is consistent with the previous user inputs with respect to the address component when the entry begins with the character string input. A record is consistent with all previous user inputs when the record is consistent with the previous user inputs with respect to all address components.

Each input field thus belongs to precisely one address component. The screen form 1 is used at any time for inputting the destination address information on a single postal item in each case.

Figure 2:
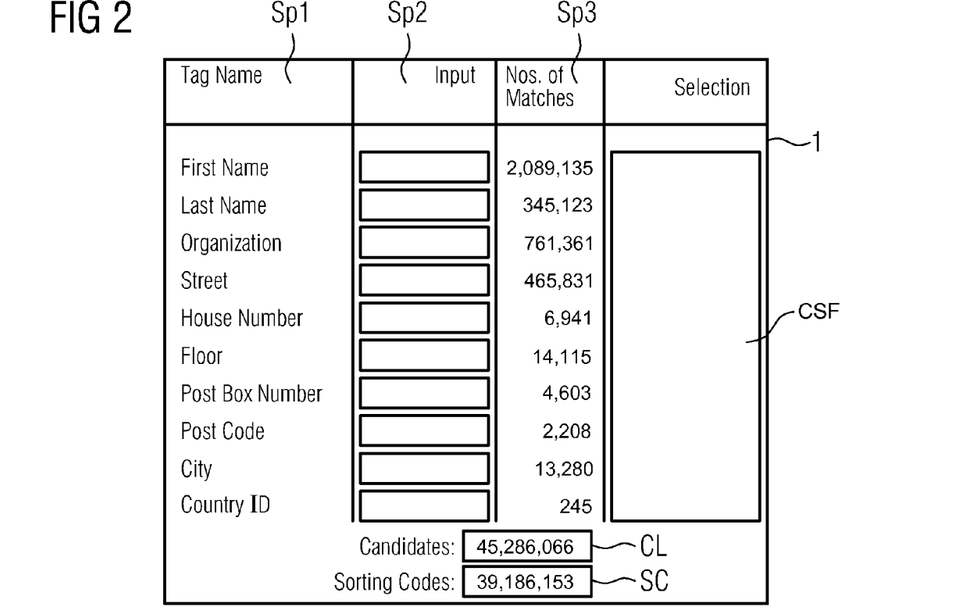
FIG. 2 is an exemplary embodiment of a screen form on a detection screen device.

FIG. 2 shows an exemplary embodiment of the screen form 1 on the screen device 2 of the detection computer 6. In the first column Col1 ("tag name") of the screen form 1, the abovementioned ten address components are shown. In the second column Col2 ("input") in each case one input field E1, E2, . . . per address component is shown, that is to say a total of ten input fields. In the third column Col3 ("Nos. of matches"), the numbers with the different entries which in each case still fit are shown.

In the example of FIG. 2, no input has yet been made. The records in the address database 10 contain 2,089,135 different first names, 345,123 different last names, 761,361 different organizations and so forth. In addition, a number-of-candidates field CL indicates how many records are candidates, that is to say consistent with all previous inputs. In the example of FIG. 2, no inputs have yet been made which is why the total number of records is indicated as the number in field CL, in this case therefore 45,286,066.

In addition, a number-of-sorting-codes field SC indicates how many different sorting codes the records which are still consistent have. As explained above, various records can have the same sorting code which is why there can be more consistent records than sorting codes of these consistent records. In field CL, the number 39,186,153 is displayed in the example of FIG. 2.

In addition, the screen form 1 contains a candidate selection field CSF. Once an input field has been selected for an address component, the different entries for this address component which possesses the consistent records are indicated in the candidate selection field CSF. Because there can be very many different entries, the different entries are preferably indicated only when their number is less than or equal to a predetermined limit number, e.g. the number is 11 at a maximum.

The following sequence is carried out repeatedly.

An operator inputs at least one character in one of the input fields E1, E2, E3, . . . .

The evaluating unit 4 determines all records in the address database 10 which are consistent with all previous user inputs. A record is consistent with all previous user inputs when each character string input into an input field is contained in the entry which the record has for the address component to which the input field corresponds.

If the user has made an input into an input field E1, the evaluating unit 4, in particular, excludes from the further determination all records which contain an identifier that the destination address does not comprise a value for the address component E1.

In the number-of-candidates field CL it is indicated how many consistent records have been determined overall. In the number-of-sorting-codes field SC it is indicated how many different sorting codes these consistent records have.

The evaluating unit 4 counts for each address component, how many different entries the determined records which are consistent with the previous user inputs have overall for this address component. These numbers are represented by the input computer 6 in the third column Col3 of the screen form 1.

In one embodiment, this sequence is carried out every time the user has input a single character into an input field. This embodiment reduces the input effort because it is indicated after each input of a character how many records are now still consistent. In an alternative embodiment, the user initially inputs one or more characters into an input field and then an input conclusion signal (e.g. the "enter" key). After that, the sequence is carried out.

Figure 3:
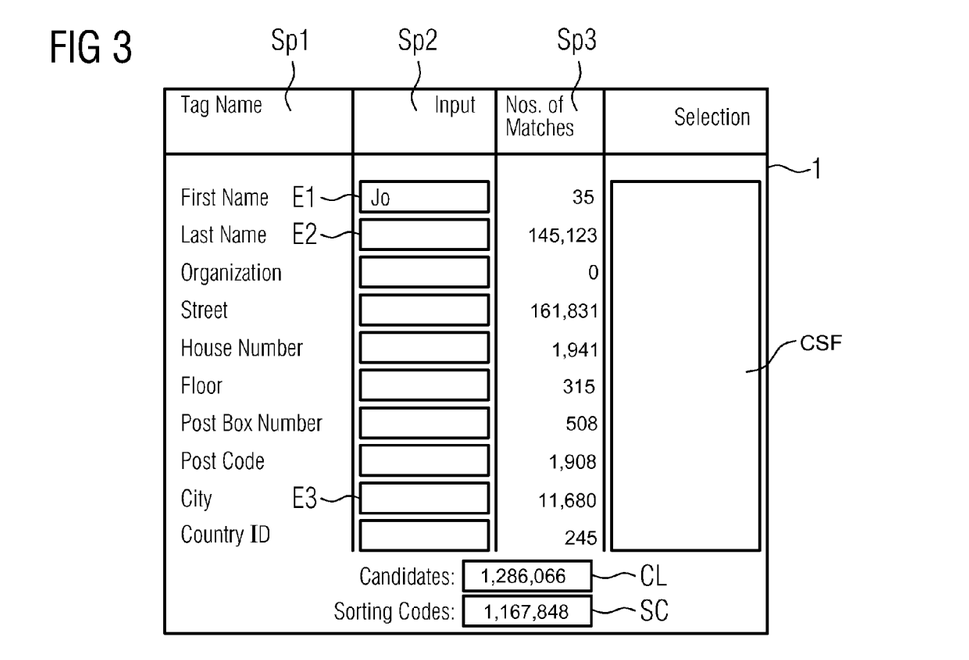
FIG. 3 is the screen form of FIG. 2 after the first two letters of the first name have been input.

In the example of FIG. 3, the destination address for a holiday postcard is being searched for. Obviously, the sender did not know the complete destination address of the addressee. The postcard therefore only contains the information Johann K??, and
on the Reixxenau.

The two "xx" indicate that the postcard is soiled at this point and therefore several letters are not legible.

A representation Rep of the image of the postcard is shown on the screen device 3 of the display computer 8. The user decides to begin by inputting the first name. The user therefore initially inputs the first two letters "Jo" of the first name into the input field E1 for the address component "first name" in the second column Col2. The records in the address database 10 still contain a total of 35 different first names beginning with "Jo". The consistent records thus have 35 different entries in the address component "first name". No single record for a legal person contains an entry beginning with "Jo" in the data field for first names so that the number 0 is indicated in the third column Col3. Further numbers in Col3 are also fewer after the input. Overall, 1,286,066 records still contain an entry in the data field for the first name which begin with "Jo" and are therefore candidates. This number is indicated in the number-of-candidates field CL. In the example, the consistent records comprise a total of 1,167,848 different sorting codes.

The user inputs a further letter into the input field E1, namely the letter "h". He has thus input the first three letters "Joh" of the first name. In the exemplary embodiment, the records now still consistent (that is to say those in which the first name begins with "Joh") have the following five different entries for the first name:
"Johannes",
"Johanna",
"Johannes-Karl",
"Johanna Gisela" and
"John".

Figure 4:
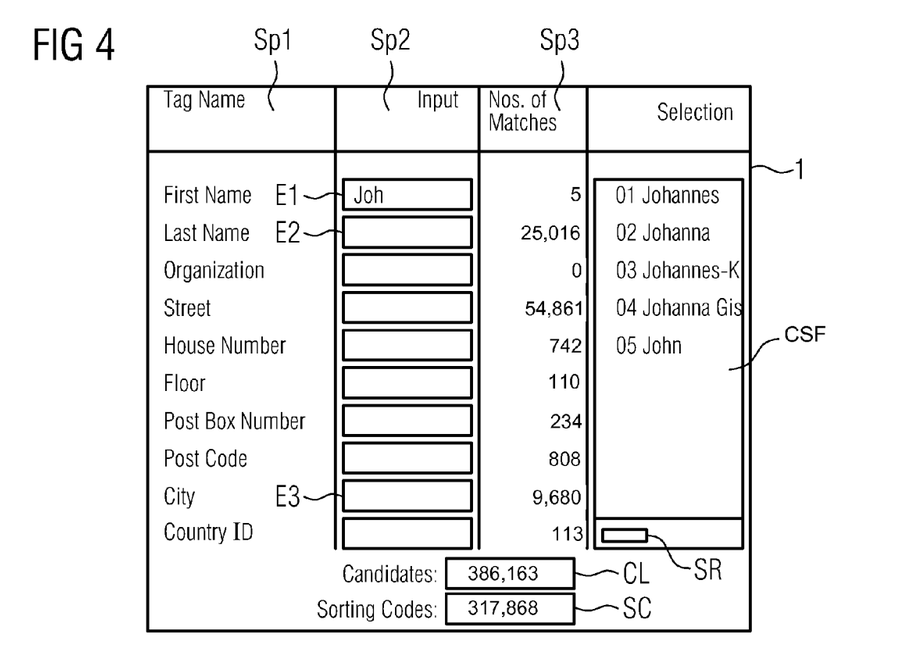
FIG. 4 is the screen form of FIG. 3 after a further letter of the first name has been input.

A limit number of 11 is predetermined. The number of different entries in the data field "first name" of the records still consistent is now smaller than this limit number, namely equal to 5. The five different entries are therefore indicated in the candidate selection field CSF. This is illustrated in FIG. 4. The candidate selection field CSF has a shift regulator SR for shifting the section shown in the horizontal direction.

Figure 5:
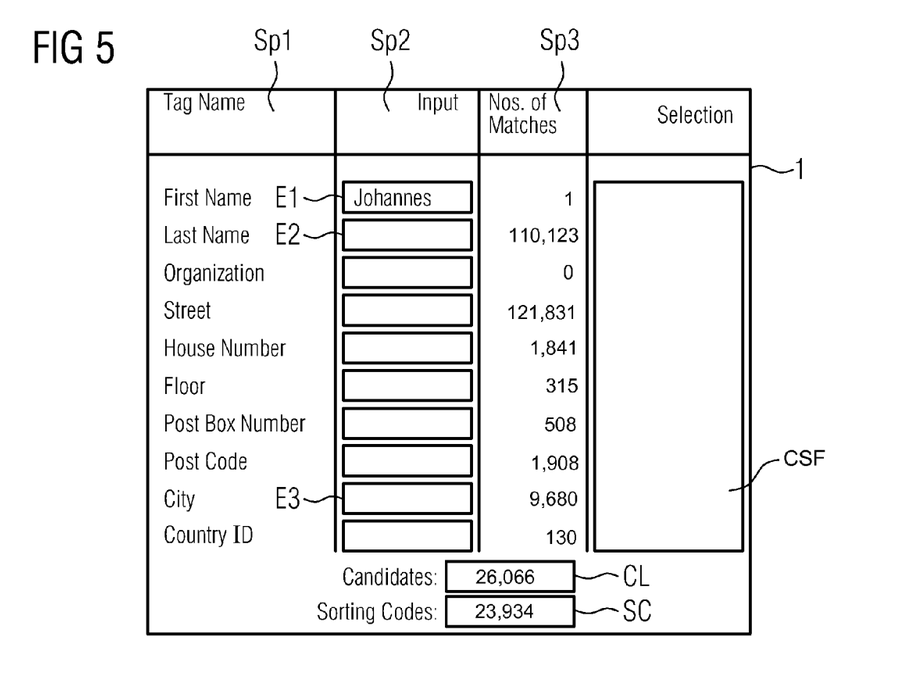
FIG. 5 is the screen form of FIG. 4 after selection of the first name.

No consistent record contains the first name "Johann". The user therefore selects the alternative "Johannes" in the candidate selection field CSF. This selection is used as input into the input field E1 for the first name. The selected character string is used as complete input, i.e. now only those records are consistent which have precisely the character string "Johannes" as entry for the first name and no additional characters. The numbers of the entries which still fit is further reduced. This is shown in FIG. 5. After this input, 26,066 candidates (destination addresses) with a total of 23,934 different sorting codes still remain.

The numbers in the third column Col3 help the user in selecting an input field for the next input. The correct destination address is often quickly found by an input into an input field with a large number of different entries because the number of candidates is drastically reduced after an input into this input field. He should not put an input into an input field next to which the number is a 0.

However, the user can make an input in each input field at any time independent of these numbers. The user is completely free in the selection into which input field he wishes to input something. In particular, it is not required first to input the destination, then the street and then the name or the house number.

Figure 6:
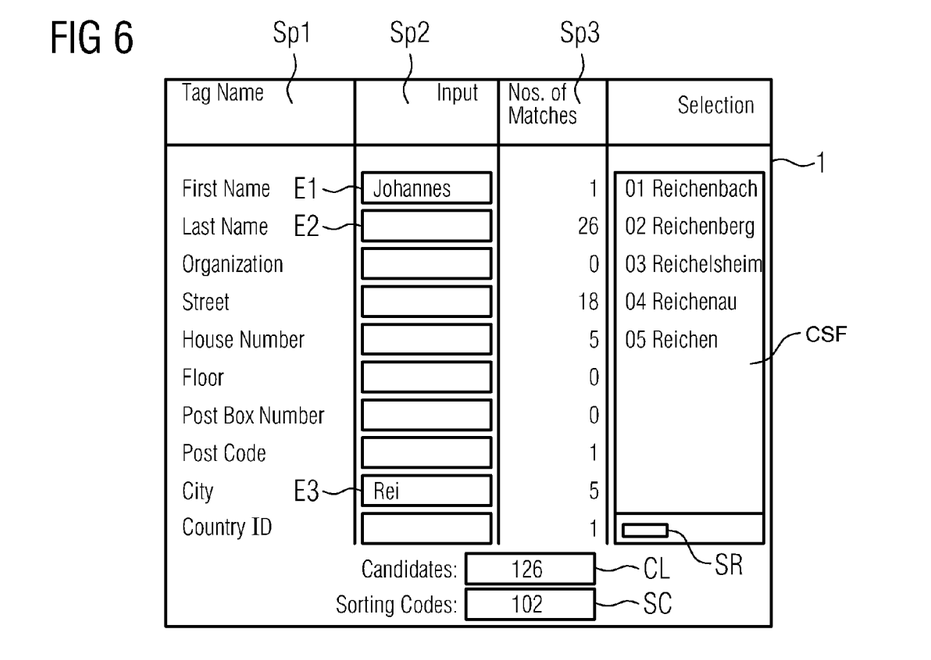
FIG. 6 is the screen form of FIG. 5 after the first three letters of the destination name have been input.

FIG. 6 shows the situation after the user has additionally input the first three letters "Rei" into the input field E3 for the destination. The further letters of the destination name are not legible. In the exemplary embodiment, the consistent records (i.e. the records for destination addresses with the first name "Johannes") have a total of five different entries for the destination. These five entries are indicated in the candidate selection field CSF.

The user selects the city name "Reichenau". This selection is used as input of the destination and entered into the input field E3. There still remain six candidates, that is to say six consistent records. This number 6 is indicated in the number-of-candidates field CL.

Figure 7:
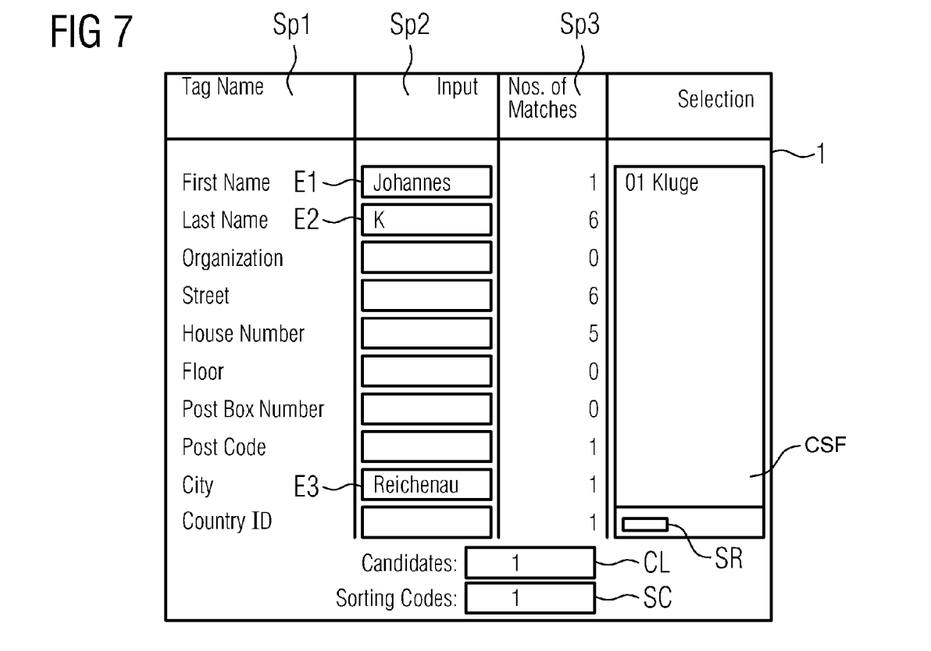
FIG. 7 is the screen form of FIG. 6 after the first letter of the last name has been input.

The user inputs the letter "K" in the input field E2 for the address component "last name". In the exemplary embodiment, there is only one record which is also still consistent with this input. This record contains the entry "Kluge" as last name. This entry is offered for selection in the candidate selection field CSF. FIG. 7 shows the screen form 1 after the input of this letter. The user selects this entry which thereupon is entered in the input field E3 for the last name. By this means, the user confirms that this last name is consistent with the information on the postal item Pi.

In one embodiment, the screen form 1 contains a menu item "fill out". If a single record is consistent with all previous user inputs, the input fields are filled automatically with the entries of this record.

The destination address of this one consistent record is used as the correct destination address to which the postal item is to be transported. As can be seen in FIG. 1, the evaluating unit 4 conveys the correct destination address DA to the sorting system 9. The sorting system 9 channels the postal item Pi into the output device AE1, AE2, ... which is allocated to this destination address.

In one embodiment, an abort criterion is met when the user has confirmed, as explained above, that the one consistent record actually shows the correct destination address.

In an alternative embodiment, the abort criterion is already met when only a single record is consistent with all previous user inputs without the user having to input a confirmation. If this alternative embodiment is used, the abort criterion is already met in the situation of FIG. 7 after the user has input "K" into the input field for the "last name", without the user having to select "Kluge".

As explained above, there are, as a rule, more consistent records than different sorting codes of these consistent records. It may happen, therefore, that, although several different records are still consistent with all previous user inputs, all these consistent records have the same sorting code. In one embodiment, the abort criterion is also met in this case. The postal item is transported to the destination address by using the sorting code.

The user can also cancel a user input again in order to correct input errors. The number of records which are consistent with all previous user inputs then rises again or at least remains identical.

It is possible that no record is consistent with all previous user inputs. This can be due to an input error or also due to the fact that the information relating to the destination address on the postal item is faulty. To take into consideration this possibility, the detection computer 6 has the capability of inputting an error message, for example by pressing a particular key (reject) or clicking on a particular input area of the screen form 1. In this case, too, the abort criterion is met. In this case, the postal item is channeled out and processed further manually by manual sorting.

It is frequently desired that the postal item is provided with a complete destination address which can be read by a person, e.g. a mailman. As a rule, the sorting code can only be read with difficulty. In one embodiment, therefore, an address sticker is generated by pushing a button when, as determined above, a single consistent record has been found and the destination address has been determined. For this purpose, a label is printed with the destination address determined. This address sticker is stuck to the postal item Pi, e.g. above the information relating to the destination address with which the postal item was provided by the sender. It is possible to additionally print a sorting code in a form readable by a person, for example as indication for the mailman who delivers this postal item.

In the text which follows, a deviation from the above example is explained. In a modified example, the postcard reads Johann K??
75?? Reixxenau The user initially inputs the character string "75" into the input field for the postcode and then the character string "Rei" into the input field for the destination. Following this, the number 0 is specified in the number-of-candidates field CL. In the third column Col3, too, the values "0" appear. This means that no record is consistent with all previous user inputs. The user thereupon deletes the last character in the input field for the destination so that this only contains the character string "7". A selection menu which contains the alternative "Reichenau" now again appears in the candidate selection field CSF. The user selects this alternative. The correct postcode is 78479. The sender was therefore wrong about the postcode.

In the exemplary embodiment described hitherto, the input fields E1, E2, ... of the screen form 1 are empty which is illustrated in FIG. 2. As a rule, however, the reading unit LE initially attempts to decipher the address automatically by OCR. The reading unit LE then frequently also succeeds in deciphering individual characters and finding the address component to which these deciphered characters belong if the complete destination address cannot be deciphered. In a modification, these deciphered characters are entered into the respective input field for the address component. For example, the reading unit LE automatically deciphers the character string "Joh" in the above example and finds that this character string belongs to the first name of the addressee. The character string is then entered into the input field E1 for the first name. The user then begins the manual input in the situation shown in FIG. 4. The user can delete an inserted character string wholly or partially if he finds that the reading unit LE has wrongly deciphered the character string.

The screen form 1 can be preferably configured. The following parameters can be changed:

the address components for which input fields are shown in the screen form 1—the input device can thus be adapted to different address databases and thus to different address systems in different countries, the limit number: if exactly the same number or fewer entries than this limit number match the previous user entries, a selection list is indicated in the candidate selection field CSF, and which indicating fields and control buttons the screen form 1 should still have.

In the exemplary embodiment, an image Im of the surface of the postal item Pi is generated which shows the destination address DA. It is also possible that, instead, the user searches the postal item itself and not the image for the destination address. This alternative embodiment is used, for example, if the postal item is too large to be processed by a sorting system in the manner described above, for example is a parcel or a roll or the postal item is damaged.

In this alternative embodiment, no display computer 8 with the screen device 3 is needed. It is again first attempted to automatically decipher the destination address. If this deciphering does not succeed, an operator reads the information relating to the destination address on the postal item and fills out input fields of the screen form 1 as described above.

The invention claimed is:

1. A method for controlling a transporting of an object, the object having at least one information item relating to a destination address to which the object is to be transported, a set of address components is predetermined and a predetermined address database is provided which in each case contains one computer-available record per destination address for a set of possible destination addresses, each record in the predetermined address database in each case includes one entry for each predetermined address component, the method comprises the steps of:

detecting at least one destination address information item on the object by automatically performing the further steps of:

displaying a screen form on a screen device of a detection computer, the screen form in each case containing one input field for each address component;

performing at least once, the sequence of:

after a user inputs into one of the input fields of the screen form, detecting a character string input into the input field and determining into which of the input fields the character string has been input;

determining whether no record, exactly one record or several records of the predetermined address database are consistent with all previous user inputs, a record is consistent with all the previous user inputs when each character string input into the input field is contained in an entry which the record has for the address component to which the input field corresponds;

checking whether a predetermined abort criterion is met;

performing the sequence again if the abort criterion is not met, the abort criterion being met at least when exactly one record is consistent with all the previous user inputs; and     triggering the transportation of the object to the destination address of the exactly one consistent record when exactly one consistent record has been found.

2. The method according to claim 1, wherein:

at least once after a determination of the input field into which the character string has been input, of the records which are consistent with all the previous user inputs, all entries for the address component which corresponds to a determined input field are determined;

the determined entries are displayed on the screen device; and when the selection of one of the entries which are displayed on the screen device is found, a selected entry is used as the character string which has been input into the determined input field.

3. The method according to claim 2, wherein it is counted for the address component corresponding to the determined input field how many different entries in the records in the address database are consistent with all the previous user inputs, and if a number of the entries is smaller than a predetermined limit of indications, the determined entries are displayed on the screen device.

4. The method according to claim 1, which further comprises:

counting for at least one address component, how many entries for the address component the records which are consistent with all previous user inputs have overall; and displaying a number of the entries on the screen device.

5. The method according to claim 4, wherein:

at least one record contains, as an entry for at least one address component for a possible destination address, an identifier that the destination address does not contain an entry for the address component; and during the counting for the address component, only those different entries are counted which are unequal to the identifier.

6. The method according to claim 1, which further comprises performing the sequence again after each input of a character into one of the input fields.

7. The method according to claim 1, wherein at least one record contains, as an entry for at least one address component for a possible destination address, an identifier that the destination address does not contain an entry for the address component, and the record, when the input of a character string into the input field for the address component has been found, is evaluated as not consistent with a previous user inputs.

8. The method according to claim 1, wherein:

each destination address contained in the predetermined address database is allocated to exactly one sorting code;

each record in the predetermined address database contains the sorting code to which the destination address of the record is allocated;

the abort criterion is met when all records which are consistent with the previous user inputs contains the same sorting code; and the transportation of the object to the destination address contains the step that the matching sorting code is used for the further transportation of the object to the destination address.

9. The method according to claim 1, which further comprises providing a reading unit which attempts to automatically decipher the destination address information with which the object is provided, and when the reading unit has deciphered a character string and has found the address component to which the character string belongs, the deciphered character string is automatically inserted into the input field for the address component before a first performance of the sequence.

10. The method according to claim 1, which further comprises generating an image of the object which contains an image of the delivery point information; and displaying the image on one of the screen device and on a further screen device.

11. The method according to claim 1, wherein when exactly one consistent record is found, performing the steps of:

generating an address sticker with the destination address of the exactly one consistent record; and providing the object with the address sticker.

12. A device for controlling a transporting of an object, the object having at least one information item relating to a destination address to which the object is to be transported, the device comprising:

an address database in each case containing one computer-available record per destination address for a set of possible destination addresses, each said record in said address database in each case contains one entry for each predetermined address component; and the device programmed to:

detect at least one destination address information item on the object;

compare a detected destination address information with the records of said address database; and     trigger, when exactly one record is consistent with all detected destination address information items, a transportation of the object to the destination address of the one record;

a detection computer with a screen device, said detection computer automatically performs a detection of the destination address information and displays a screen form on said screen device, the screen form in each case containing one input field for each said address component; and an evaluating unit;

the device performing a following sequence at least once:
- said detection computer, after a user input into one of the input fields of the screen form detects a character string input and determines the input field into which the character string has been input;
- said evaluating unit determines whether no record, exactly one record or several records of the address database are consistent with all previous user inputs; and
- said evaluating unit checks whether a predetermined abort criterion is met, wherein a record is consistent with all the previous user inputs when each character string input into an input field is contained in an entry which the record has for the address component to which the input field corresponds;

the device is arranged for performing the sequence again when the abort criterion is not met, the abort criterion being met at least when exactly one record is consistent with all previous user inputs; and the device furthermore triggering the transportation of the object to the destination address of the exactly one consistent record when exactly one consistent record has been found.

* * * * *